UNITED STATES PATENT OFFICE.

THOMAS L. REED AND EUGENE F. PHILLIPS, OF PROVIDENCE, R. I.

IMPROVEMENT IN INSULATING AND FINISHING COMPOUNDS FOR CONDUCTING-WIRES.

Specification forming part of Letters Patent No. 144,794, dated November 18, 1873; reissue No. 7,040, dated April 4, 1876; application filed December 17, 1875.

*To all whom it may concern:*

Be it known that we, THOMAS L. REED and EUGENE F. PHILLIPS, of the city and county of Providence, in the State of Rhode Island, have invented certain new and useful Improvements in Telegraph Office-Wire, and a compound for treating the same.

Our invention consists, partially, in a novel insulating compound, especially adapted for the manufacture of our improved office-wire. Our invention consists, further, in telegraphic office-wire covered with fibrous material, treated with insulating compound, smoothly finished on the surface, and coated with a hard gum, applied in a volatile solvent, which is also a solvent of the insulating matter; and we do hereby declare that the following specification is a clear and true description thereof.

In the way of description, we will assume that a piece of ordinary wire has already been covered with a braided fabric, in the usual manner, with one or more layers, each or all of which have been properly charged with any of the well-known insulating compounds or solutions, which has been properly dried, and is ready for receiving our finishing process, by one of the methods which in practice we have adopted. After the wire has been covered with the textile matter, the compound may be applied by drawing the covered wire through the melted mixture, and thence through a clearing-plate, having a funnel-shaped aperture of proper diameter; or a braiding-machine of ordinary construction may be provided with yarn or twine which has been previously charged with the hot compound hereafter described, and the braiding process is completed as heretofore conducted. The compound which we have found best suited to the purpose is composed of, say, two parts Canada balsam; one part solid paraffine of commerce; one part beeswax of standard quality. This compound is well mixed and applied to the yarn while hot.

The Canada balsam possesses no very marked desirable characteristics over several of the more common pine gums and resins; and we are aware that approximate results will be attained if the ordinary pine resins be used instead of the balsam in the same combination. The beeswax may be crude or clarified; the purer it is, however, the better it is suited for the purpose, on account of its increased hardness and solidity. We are aware that the proportions named can be varied and approximate results attained.

As it is sometimes desirable to have variously-colored wires for the ordinary purposes of distinction where many are used, and also to render them more attractive to the eye when used in hotels, brokers' offices, merchants' private offices, &c., we add to the said compound coloring matter in suitable quantities to afford the depth and shade of color desired. As instances, white lead may be employed to bring the compound up to as near white as may be desired; such a compound can be toned by the addition of red lead, ocher, chrome, Chinese or Prussian blue, to produce any desired color, or shade of any color.

After the braiding has been completed, when the yarn has been previously charged with the compound, the surface of the fabric is subjected to the action of "slickers," or smoothing-tools having a proper surface, and as it cools a gentle friction develops a smooth surface on the compound which exudes from the interstices of the yarn. While still soft, and during the slicking process, bronzing-powder may be applied, in a manner well known, and thus impart to the exterior of the compound conductor the appearance of a massive metallic wire.

Another style of wire or conductor may be made by incasing the metallic wire within numerous longitudinal strands or threads, which are firmly united to each other and to the wire by a thread laid or wound spirally on the outside and tightly sewed. The longitudinal strands may be applied with the compound already charged, or the compound may be subsequently applied. If charged with the compound before being laid, a sufficient quantity of it will be left upon the surface, or exude from the interstices, to afford the desirable exterior coating. Desirable friction from contact with any smooth hard substance can be applied by many well-known mechanical devices adapted to similar service.

For obtaining a durable, hard, smooth, and attractive surface-finish on wire thus treated with an insulating compound, we apply to its surface a thin solution of a hard flinty gum, such as shellac, for instance, held in a solvent, which is also a solvent of one or more of the ingredients of which the insulating or finishing compound is composed, whereby a practically perfect unity is effected between the exterior layer of hard gum thus applied and the compound. For use with a compound composed in part of wax or of rosin, high-proof alcohol is the best solvent known to us.

The combination of "flocks" or other disintegrated fibrous matter with a compound substantially of the character referred to can be employed with satisfactory results as an exterior coating, for it will, with gentle friction, develop a fine superficial finish, and possess a desirable degree of hardness and tenacity. The method of applying the compound, or its equivalent, can be extensively varied without materially affecting the result. It will only be necessary that a proper unity exists between the fabric or textile matter and the compound, and that a sufficient quantity of the latter remains thereon to completely constitute an exterior covering. A high degree of insulation can be effected by the use of the compound, when an exterior finish is not desirable, applied after the manner of any of the well-known gums or mixtures.

We are aware that telegraphic wires and cables have heretofore been made with an inclosing fabric of braid or wound threads and yarns in great variety; that such yarns, not only prior but subsequent to the braiding or winding processes, have been treated or charged with solutions of paraffine and other soluble insulating matter; also, that cables and wires for telegraphic purposes have been superficially coated with gums and gummy compounds which belong to the class generally known as vulcanizable. When applied in mass, such cables and wires have sometimes been vulcanized; when applied in solution, they have been generally simply dried, after the evaporation of the volatile solvents. We are also aware that prior to our present invention wires covered with fibrous material have been by us and others treated with paraffine and subjected to the action of "slickers," or smoothing-tools having a proper surface, whereby the surplus paraffine was removed from the fibrous covering of the wire, and the surface thereof rendered smooth and even through the compressive action of the smoothing-tools. This method of finishing office-wires constitutes no part of the invention herein described and claimed.

By combining with the paraffine resinous gums and wax, substantially as set forth, the compound is rendered much tougher and harder than either the paraffine or wax would otherwise be, and it remains unchanged at a slightly higher degree of temperature than either the paraffine or wax could resist if the heat were applied thereto separately. The wire which is dressed with paraffine alone is of a greasy dull aspect, and the paraffine is liable to crackle or rub off on being handled, and to catch and retain dust and dirt. On the other hand, if soluble gums, &c., be applied directly to the fibrous material in solution, as has been heretofore practiced, they are liable to be unevenly distributed, and, while drying, accumulate more in some places than in others. This latter is especially the case as an incident to the use of the non-volatile solvents, and the gums which they will hold in solution. Should volatile solvents be employed with hard gums applied directly to the fibrous covering, the drying is more rapid, but the coating is not so flexible, and is the more liable to crack and scale. The liability of the coating of flinty gum to crack or scale is practically obviated when applied in accordance with our invention, because the solvent which holds the flinty gum is also a good solvent of the wax as well as of the balsam or resin, of which the insulating and finishing compound is in part composed, and therefore the flinty gum is thoroughly incorporated with the portion of the compound to which the solution is applied. These peculiarities render wire treated with our novel compound and surfaced with flinty gum readily distinguishable from wires prepared as heretofore.

We are not aware that prior to our invention any telegraph office-wire or other telegraphic conductors were ever finished with an exterior surface possessing the characteristics of wires or conductors treated with a compound and a solution of hard gum of the character herein described; and We therefore claim as new, to be secured to us by Letters Patent—

1. The compound composed of Canada balsam, or equivalent gum, paraffine, and beeswax, with or without coloring pigment, for insulating, and for giving to telegraphic conducting-wires a finished exterior, substantially as described.

2. Telegraphic office-wire covered with fibrous material treated with an insulating and finishing compound, and finished with a surface coating of hard flinty gum, substantially as described.

THOMAS L. REED.
EUGENE F. PHILLIPS.

Witnesses:
PHILIP F. LARNER,
WM. C. WOOD.